United States Patent [19]

Sakano et al.

[11] 4,263,711
[45] Apr. 28, 1981

[54] METHOD OF MAKING ARMATURE OF DOUBLE INSULATION CONSTRUCTION

[75] Inventors: Tomiaki Sakano, Hirakata; Hiromichi Yamamoto, Neyagawa; Shigeru Kajiwara, Katano, all of Japan

[73] Assignee: Matsushita Electric Industrial Co., Ltd., Osaka, Japan

[21] Appl. No.: 938,398

[22] Filed: Aug. 31, 1978

[30] Foreign Application Priority Data

Sep. 5, 1977 [JP] Japan .................................. 52/106927

[51] Int. Cl.³ .......................................... H01R 43/06
[52] U.S. Cl. ...................................... 29/597; 29/598; 29/733; 264/272; 310/43
[58] Field of Search ........................ 29/597, 598, 733; 264/272; 310/42, 43, 45, 215, 235

[56] References Cited

U.S. PATENT DOCUMENTS

| 1,921,112 | 8/1933 | Apple | 310/43 X |
| 2,756,354 | 7/1956 | Baron | 310/43 |
| 3,212,170 | 10/1965 | Marshall | 310/43 X |

FOREIGN PATENT DOCUMENTS 1210349  3/1960  France ........................................ 310/43

*Primary Examiner*—Carl E. Hall
*Attorney, Agent, or Firm*—Joseph W. Farley

[57] ABSTRACT

An armature of double insulation construction for commutator motors of the wound-rotor type and a method of making the armature. An insulator insulating an iron core from a shaft and windings from the iron core also insulates a commutator from the shaft and unites the shaft, iron core and commutator into an integral rigid body. The armature can be fabricated with high precision by a simplified method.

6 Claims, 10 Drawing Figures

FIG.1
FIG.3
FIG.2
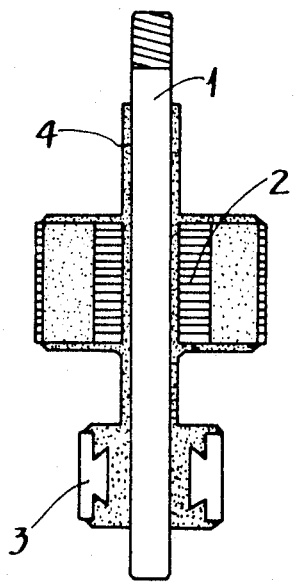
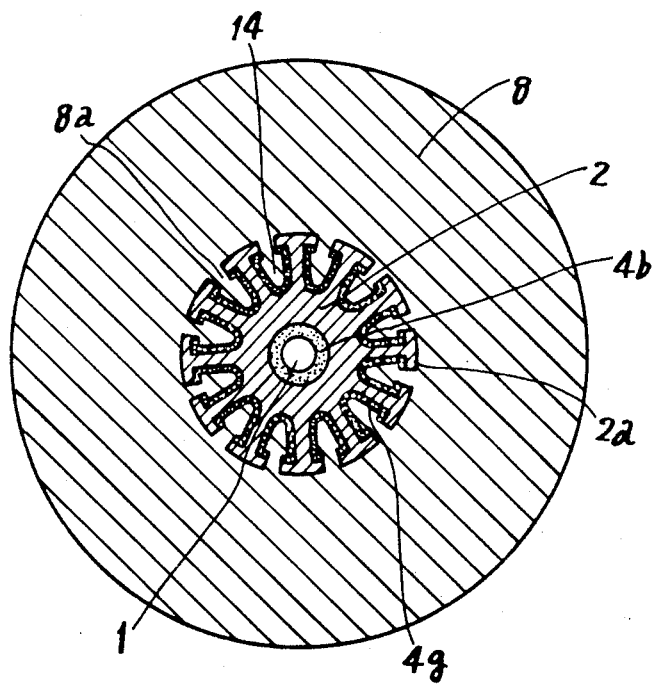
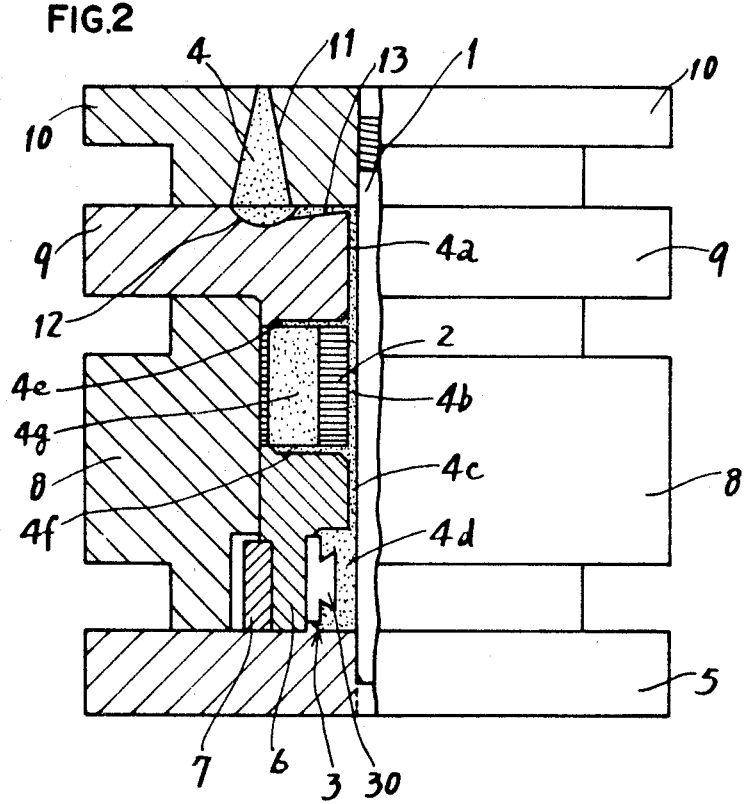

METHOD OF MAKING ARMATURE OF DOUBLE INSULATION CONSTRUCTION

The present invention relates to an armature for commutator motors of wound-rotor type, and more particularly to an armature of double insulation construction in which in addition to an insulator provided between an iron core and windings formed thereon, the iron core and commutator are insulated from the shaft. The invention also relates to a method of making the armature.

Conventional armatures of the double insulation type are made by preparing a surface-insulated shaft, an iron core and a commutator assembly of individually insulated segments, and mounting the core and the commutator on the shaft with a press fit to provide an assembly. Such armatures require a number of manufacturing steps and therefore involve problems with respect to precision which must be overcome by an increased number of cumbersome and costly steps.

The main object of this invention is to eliminate these problems and to provide an armature of double insulation construction with ease and improved precision.

Another object of this invention is to provide an armature of double insulation construction in which an insulator integral with and of the same material as an insulator insulating an iron core from a shaft and windings from the iron core unites the shaft and commutator into an integral rigid body with the commutator thereby insulated from the shaft, the component segments of the commutator being integrally incorporated into the rigid body and individually insulated with the insulator.

Another object of this invention is to provide a method of making the armature comprising the steps of placing into a mold a multiplicity of commutator segments in a circular arrangement and a core of superposed iron plates, placing a shaft in the center of the mold with a specified clearance provided between the shaft and the commutator segments and the iron core, pouring an insulating material into the mold to fill the clearance, opening the mold after curing of the material, withdrawing the resulting product from the mold, and winding conductors on the iron core.

Various other features and advantages of this invention will become apparent from the following description with reference to the accompanying drawings, in which:

FIG. 1 is a sectional view showing an armature of double insulation construction according to this invention with windings removed therefrom;

FIG. 2 is a view partly in section and illustrating a mode of practicing the method of this invention by transfer molding;

FIG. 3 is a sectional view showing an iron core portion;

FIG. 5a is a front view showing a commutator segment;

FIG. 5b is a view in section taken along the line V—V in FIG. 5a;

Figure 7:
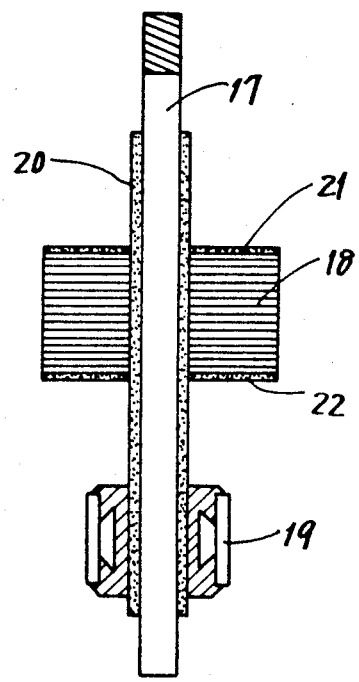
FIG. 7 is a sectional view showing a conventional armature.

For a better understanding of the features of the present invention and preferred embodiments thereof, a conventional armature will be described first with reference to FIG. 7. The armature comprises a shaft 17 formed with a surface insulating layer 20, and an iron core 18 and a commutator 19 which are fixedly mounted on the shaft 17 with a press fit. The core 18 is provided with end insulators 21 and 22 made from a pressboard impregnated with synthetic resin or vulcanized fiber. The slotted portions of the iron core are insulated with a polyethylene terephthalate film or epoxy resin powder coating composition. The surface insulating layer 20 on the shaft 17 is formed by winding glass cloth or glass roving impregnated with epoxy resin or phenolic resin, curing the resin with heating and cutting or grinding the resulting layer to a specified dimension. The commutator 19 is composed of segments assembled into a rigid piece with phenolic resin or with a mica-insulated inner peripheral iron bush by crimping.

With the armature of the type described, pores formed in the interior of the surface insulating layer on the shaft when the glass cloth or like material is impregnated with resin appear on the surface when the insulating layer is machined as by cutting or grinding, so that the insulating layer press-fitted into the iron core involves a problem in withstanding voltage. Moreover the dimensional accuracy of the shaft insulating layer machined is not always so high as to ensure the concentricity of the iron core and commutator with the shaft press-fitted thereto. Thus there arises the necessity of cutting or grinding the outer peripheries of the core and commutator mounted on the shaft. In addition to the various steps needed for forming the insulating layer itself on the shaft, the construction described requires individual steps of machining the insulating layer for a press fit, insulating the slotted portions of the iron core, insulating the end surfaces of the iron core and insulating the commutator segments and assembling the segments into a rigid piece. These steps render the product costly. Very cumbersome procedures are also necessary for press-fitting the shaft to the iron core and to the commutator and for machining the outer peripheries of the core and commutator.

With reference to FIGS. 1 to 5b, a preferred embodiment of this invention will be described below which is free of these drawbacks of the conventional armature.

FIG. 1 shows a shaft 1, an iron core 2, a commutator 3 and an insulator 4. The armature of this invention has a double insulation construction and is characterized in that the insulator on the surface of the shaft 1 for insulating the iron core 2 from the shaft 1 also insulates the commutator 3 from the shaft with the commutator segments thereby individually insulated from one another and unites the shaft, iron core and commutator into an integral rigid body, the same insulator further insulating the slotted portions of the iron core and end surfaces of the iron core. Thus the insulator unites the parts into an integral assembly with improved accuracy and produces a reliable insulating effect.

The method of making the armature of this invention will be described below in detail with reference to the drawings showing embodiments. FIG. 2 shows a first mold member 5 and a holding mold member 6 having commutator segments 30 fixedly press-fitted therein along its inner periphery. The holding mold member 6 and a clamp ring 7 are placed in position within the first mold member 5. A second mold member 8 is then placed on the first mold member 5 as specified, and the shaft 1 and iron core 2 are placed into the second and first mold members 8 and 5. Third and fourth mold members 9 and 10 are further placed in position to assemble a mold with the shaft 1, iron core 2 and commutator segments 30 placed therein as inserts. An insulating material is poured under specified pressure into the mold maintained at a predetermined temperature to fill up the clearance between the mold and the inserts and is allowed to stand for a specified period of time for curing. The cured material insulates the inserts individually and assembles them into an integral rigid body. The mold is thereafter opened to withdraw the molded product, on which conductors are wound to provide a finished armature.

The mold shown in FIG. 2 is adapted for transfer molding. The molding material 4 passing through a sprue 11 is poured into the mold via an annular runner 12 and a gate 13 and forms surface insulating layers 4a and 4c on the shaft 1 and an insulating layer 4b between the shaft 1 and the iron core 2. At the same time, the material fixes the commutator segments 30 together as individually insulated from one another, with an insulating layer 4d formed between the shaft 1 and the segments 30. The insulating material assembles the inserts into an integral rigid body. Furthermore the insulating material joins the core forming iron plates together while forming insulating layers 4e and 4f on the end faces of the iron core 2 and insulating layers 4g on the slotted portions of the core.

FIG. 3 shows the shape of the second mold member 8 for forming the insulating layers 4g on the slotted portions of the core. The iron core 2 is supported against vertical displacement by its teeth 2a being held between the upper end of the holding mold member 6 and the lower end of the third mold member 9. The iron core 2 is circumferentially supported by projections 8a projecting from the inner periphery of the second mold member 8 and fitting in the openings between the iron core teeth 2a. Slot core portions 14 extending radially inwardly from the projections 8a fit in the core slots so that insulating layers 4g of predetermined thickness for insulating the core slotted portions can be formed over the outer surface of the core portions 14. The core portions 14 can be provided on the holding mold member 6 or on the third mold member 9.

Figure 4:
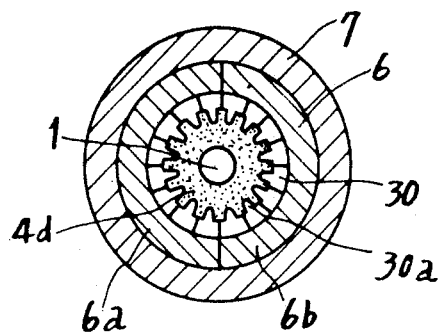
FIG. 4 is a sectional view showing a commutator portion.
Figures 5A, 5B:
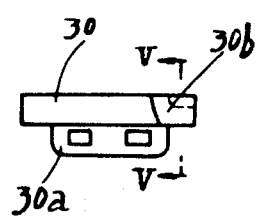

FIG. 4 shows the holding mold member 6 and clamp ring 7. The commutator segments 30 are press-fitted at their body portions to the inner periphery of the holding mold member 6 with their feet 30a directed to the center. The holding mold member 6 comprises two divided pieces 6a and 6b which are adapted to be fastened together by the clamp ring 7. After the commutator segments 30 have been assembled into a rigid piece within the mold, the mold member 6 is removed, and the assembled piece is slotted as by cutting between the segment body portions to individually separate the body portions and make the segments elecrically independent of one another. FIGS. 5a and 5b show an example of the commutator segment 30. The riser portion 30b of the segment has cutouts for permitting the molding material to fill the spaces between the segments so that the adjacent segments will not contact each other at the riser portions when ends of the windings are connected to the commutator. A riser groove 30c can be formed in the segment before it is placed into the mold.

The term "insulating material" means a molding material amenable to transfer molding, injection molding, etc. or cast resin. Suitable molding materials are thermosetting resin materials having satisfactory thermal and mechanical properties and consisting essentially of phenolic resin, unsaturated polyester resin, epoxy resin or the like. For motors to be loaded moderately during operation, thermoplastic resin materials such as saturated polyester resin, polyamide resin and polyphenylene oxide resin are useful because they have higher amenability to injection molding. Useful cast resins are those consisting predominantly of epoxy resin, while urethane resin which is curable relatively rapidly is advantageous to use.

Figure 6A:
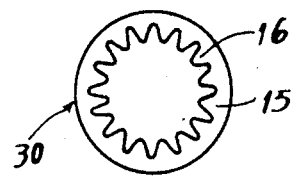
FIGS. 6a, 6b and 6c illustrate a method of making commutator segments from a pipe, FIG. 6a being a plan view showing a first step, FIG. 6b being a front view partly broken away and showing the same, FIG. 6c being a front view partly broken away and showing a second step.
Figure 6B:
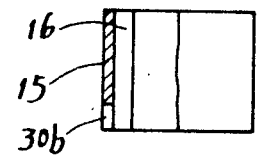
Figure 6C:
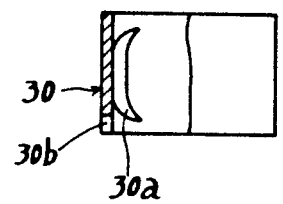

The term "commutator segments" generally refers to segments serviceable as a commutator 3 as included in a finished armature after having been incorporated into a rigid body along with the shaft. Thus they need not be in the form of individually separate and independent commutator segments 30 when made into an integral rigid body. FIGS. 6a, 6b and 6c show the steps of making such commutator segments from a pipe 15 for illustrative purposes. Projections 16 are formed on the inner surface of the pipe 15 by drawing a die or broaching (FIGS. 6a and 6b), and both ends of the projections 16 are cut and raised to form foot portions (FIG. 6c). The workpiece is then made integral with the shaft and iron core and thereafter separated into electrically independent commutator segments by cutting to eventually provide a commutator 3. Alternatively separate commutator segments may be fixedly press-fitted into the holding mold member 6 with mica or like insulator interposed between each two adjacent segments and thereafter incorporated into an integral rigid body.

To provide enhanced adhesion between the shaft and the insulating layer thereon, the shaft surface can be knurled, grooved or processed by parkerizing with use of a phosphate. For the same purpose and to give increased strength to the shaft against load, the shaft can be hardened as by nitriding.

The iron core may be prepared in the form of a block of superposed iron plates, which however need not be joined together with pins or by welding. The iron plates may be held together, for example by partially forming on the plates indentations and projections which are engageable with each other and fitting the plates together by the engagement of the projections in the indentations. The iron plates thus assembled can be made into a rigid body with the insulating material.

According to the method of this invention, the commutator can be formed simultaneously when the current passing components are insulated from the shaft, with the resulting insulator uniting the shaft, iron core and commutator segments into a rigid body. This construction therefore has more stable properties to withstand voltage and higher dimensional stability than conventional devices. Thus the present method provides armatures by simplified procedures, at a low cost and with high precision since the method does not require the steps conventionally needed for cutting or grinding the shaft, press-fitting the iron core and commutator to the shaft, separately preparing the commutator and insulating the iron core.

What is claimed is:

1. A method of making an armature of double insulation construction comprising the steps of placing in position within a first mold member (5) a clamp ring (7) surrounding a holding mold member (6) having commutator segments fixedly press-fitted therein along its inner periphery; then placing in position on the first mold member (5) a second mold member (8) for circumferentially supporting an iron core (2) having circumferentially spaced teeth; thereafter placing a shaft (1) and the iron core (2) into the mold members (8), (5) with a specified clearance provided between the shaft and each of the commutator segments and the iron core; further placing a third mold member (9) above the holding mold member (6) and supporting the teeth of the iron core therebetween against vertical displacement; pouring an insulating material into the space in the resulting mold assembly around and between the parts placed therein; allowing the mold assembly to stand for a specified period of time to cure the material and thereby unite the shaft and the iron core into a rigid body with the shaft and core insulated from each other, the commutator segments into a rigid body as a commutator with the segments insulated from one another, and the commutator and the shaft into a rigid body with the shaft and commutator insulated from each other all at the same time; opening the mold assembly, withdrawing the resulting product therefrom, and winding conductors on the iron core.

2. A method as defined in claim 1 wherein said holding mold member is composed of two divided pieces surrounded by said clamp ring.

3. A method as defined in claim 1 wherein said second mold member is inserted between and is spaced from the teeth of the iron core by a clearance for forming between the teeth an insulating layer of predetermined thickness, and the iron core is composed of a plurality of superposed plates joined together into an integral rigid body with the insulating material.

4. A method as defined in claim 1 further comprising providing the commutator segments with apertured feet projecting radially inwardly toward the shaft and adapted to be interlockingly embedded in the insulating material.

5. A method as defined in claims 1, 2, 3 or 4 further comprising treating the surface of the shaft by nitriding prior to placing the shaft in the mold members.

6. A method as defined in claims 1, 2, 3 or 4 further comprising treating the surface of the shaft with a phosphate prior to placing the shaft in the mold members.

* * * * *